United States Patent
Takahata et al.

(10) Patent No.: US 9,587,602 B2
(45) Date of Patent: Mar. 7, 2017

(54) FUEL HIGH-PRESSURE PIPE

(71) Applicant: YANMAR CO., LTD., Osaka-shi, Osaka (JP)

(72) Inventors: Terumitsu Takahata, Osaka (JP); Hiroko Okita, Osaka (JP); Makiko Adachi, Osaka (JP)

(73) Assignee: YANMAR CO., LTD., Osaka-Shi, Osaka (JP)

( * ) Notice: Subject to any disclaimer, the term of this patent is extended or adjusted under 35 U.S.C. 154(b) by 0 days.

(21) Appl. No.: 14/767,709

(22) PCT Filed: Jul. 25, 2013

(86) PCT No.: PCT/JP2013/070172
§ 371 (c)(1),
(2) Date: Aug. 13, 2015

(87) PCT Pub. No.: WO2014/125664
PCT Pub. Date: Aug. 21, 2014

(65) Prior Publication Data
US 2015/0369185 A1     Dec. 24, 2015

(30) Foreign Application Priority Data
Feb. 14, 2013  (JP) ................................. 2013-027013

(51) Int. Cl.
*F02M 55/02*        (2006.01)
*F02M 37/00*        (2006.01)

(52) U.S. Cl.
CPC ........ *F02M 37/0017* (2013.01); *F02M 55/02* (2013.01)

(58) Field of Classification Search
CPC ........................... F02M 37/0017; F02M 55/02
(Continued)

(56) References Cited

U.S. PATENT DOCUMENTS 4,893,601 A * 1/1990 Sugao ................ F02M 37/0017
                                                         123/468
5,617,828 A * 4/1997 Kuegel ................ F02M 55/005
                                                         123/468
(Continued)

FOREIGN PATENT DOCUMENTS

JP        2006194132 A      7/2006
JP        2008533387 A      8/2008
(Continued)

OTHER PUBLICATIONS

International Search Report corresponding to Application No. PCT/JP2013/070172; Date of Mailing: Oct. 29, 2013, with English translation.

*Primary Examiner* — Hieu T Vo
*Assistant Examiner* — Arnold Castro
(74) *Attorney, Agent, or Firm* — Cantor Colburn LLP (57) ABSTRACT

In order to constitute a fuel high-pressure pipe that is compact and easy to connect to injectors, one of both the end sections of a fuel high-pressure pipe is formed as a first connecting section connected to a fuel supply port of one injector, and the other one of the end sections of the fuel high-pressure pipe is formed as a second connecting section connected to a fuel discharge port of another injector. The first connecting section and the second connecting section are linearly formed parallel to each other, and head sections of the first connecting section and the second connecting section, said head sections being on the connecting side to respective injectors, are formed in the directions opposite to each other.

4 Claims, 11 Drawing Sheets

(58) Field of Classification Search
USPC .......................................................... 123/468
See application file for complete search history.

(56) References Cited

U.S. PATENT DOCUMENTS

| | | | | |
|---|---|---|---|---|
| 6,126,208 | A * | 10/2000 | Asada | B21C 37/29 |
| | | | | 123/468 |
| 7,347,187 | B2 * | 3/2008 | Perini | F02F 7/006 |
| | | | | 123/456 |
| 2006/0000449 | A1 | 1/2006 | Ricco et al. | |
| 2006/0027214 | A1 * | 2/2006 | Watanabe | F02M 55/025 |
| | | | | 123/468 |
| 2007/0006848 | A1 * | 1/2007 | Ricco | F02M 55/025 |
| | | | | 123/456 |
| 2008/0184962 | A1 * | 8/2008 | Pauer | F02M 51/0603 |
| | | | | 123/457 |
| 2010/0186829 | A1 * | 7/2010 | Guerineau | F02M 55/002 |
| | | | | 137/312 |
| 2011/0315117 | A1 * | 12/2011 | Gerstner | F02M 55/004 |
| | | | | 123/447 |

FOREIGN PATENT DOCUMENTS

| | | |
|---|---|---|
| JP | 2010071293 A | 4/2010 |
| JP | 2011017257 A | 1/2011 |

\* cited by examiner

FUEL HIGH-PRESSURE PIPE

CROSS REFERENCE TO RELATED APPLICATIONS

This is the U.S. national stage of application No. PCT/JP2013/070172, filed on Jul. 25, 2013. Priority under 35 U.S.C. §119(a) and 35 U.S.C. §365(b) is claimed from Japanese Application No. 2013-027013, filed Feb. 14, 2013, the disclosure of which is also incorporated herein by reference.

TECHNICAL FIELD

The present invention relates to a fuel high-pressure pipe, especially a fuel high-pressure pipe which is a fuel supply passage between injectors provided in an engine.

BACKGROUND ART

Conventionally, there is a well-known fuel high-pressure pipe which connects a plurality of injectors provided in an engine to each other. For example, injectors shown in the Patent Literature 1 are arranged in a line along a discharge route of a high-pressure pump. A first injector is connected directly via a connector to the high-pressure pump, and a second injector is connected via a return pipe, projected from a corresponding connector, to a pressure regulator. The other two injectors are arranged between the first injector and the second injector, and connected via a fuel high-pressure pipe to the first injector and the second injector at upstream and downstream sides thereof.

In the engine configured as the above, the fuel high-pressure pipe is provided so as to project outward from the injector (in a direction perpendicular or slanted to an arrangement direction of the injector). The fuel high-pressure pipe is formed in a U-like or J-like shape so as to be connected easily to the injector. The U-shaped fuel high-pressure pipe is bent at its middle section so as to be connected more easily to the injector.

PRIOR ART REFERENCE

Patent Literature

Patent Literature 1: the Japanese Patent Laid Open Gazette 2010-71293

DISCLOSURE OF INVENTION

Problems to Be Solved by the Invention

However, the U-shape forming and bending of the fuel high-pressure pipe need labors, whereby the cost is increased. When the fuel high-pressure pipe is formed in a J-like shape, a full length from the most upstream injector to the most downstream injector (in the arrangement direction of the injectors) becomes large, thereby increasing a pressure fluctuation.

The present invention is provided in consideration of the above problems. The purpose of the present invention is to provide a fuel high-pressure pipe which is compact and can be connected easily to an injector.

Means for Solving the Problems

The problems to be solved by the present invention have been described above, and subsequently, the means of solving the problems will be described below.

A fuel high-pressure pipe according to the present invention forms a fuel supply passage between adjacent injectors. One of end sections of the high-pressure pipe is a first connecting section connected to a fuel supply port of one of the injectors, and the other end section is a second connecting section connected to a fuel discharge port of the other injector. The first connecting section and the second connecting section are formed straight and parallel to each other, and the first connecting section and the second connecting section are formed to have respective connection sides to be connected to the respective injectors so that the respective connection sides of the first and second connection sections are directed opposite to each other.

Preferably, the fuel high-pressure pipe has a plurality of curving sections between the first connecting section and the second connecting section.

Preferably, the fuel supply port and the fuel discharge port of each of the injectors are arranged opposite to each other, and when the fuel supply ports of the plurality of injectors are directed to the same side, the first connecting section is connected to the fuel supply port of one of the injectors and the second connecting section is connected to the fuel discharge port of the other injector so that the fuel high-pressure pipe is connected between the one of the injectors and the other injector.

Effect of the Invention

According to the present invention, the fuel high-pressure pipe which is compact and can be connected easily to the injector can be provided. Especially, in the case in which the engine has the plurality of the injectors arranged in a line, the fuel high-pressure pipe connected between the adjacent injectors are not expanded in both the arrangement direction (longitudinal direction) of the injectors and the direction perpendicular thereto (lateral direction), whereby the engine can be configured compactly in both the arrangement direction (longitudinal direction) of the injectors and the direction perpendicular thereto (lateral direction).

BRIEF DESCRIPTION OF DRAWINGS

FIGS. 8A and 8B are drawings of only the fuel high-pressure pipe 11 connected to the injectors.

FIGS. 10A and 10B are drawings of the fuel high-pressure pipe 111 before being connected to the injectors.

DETAILED DESCRIPTION OF THE INVENTION

Figure 1:
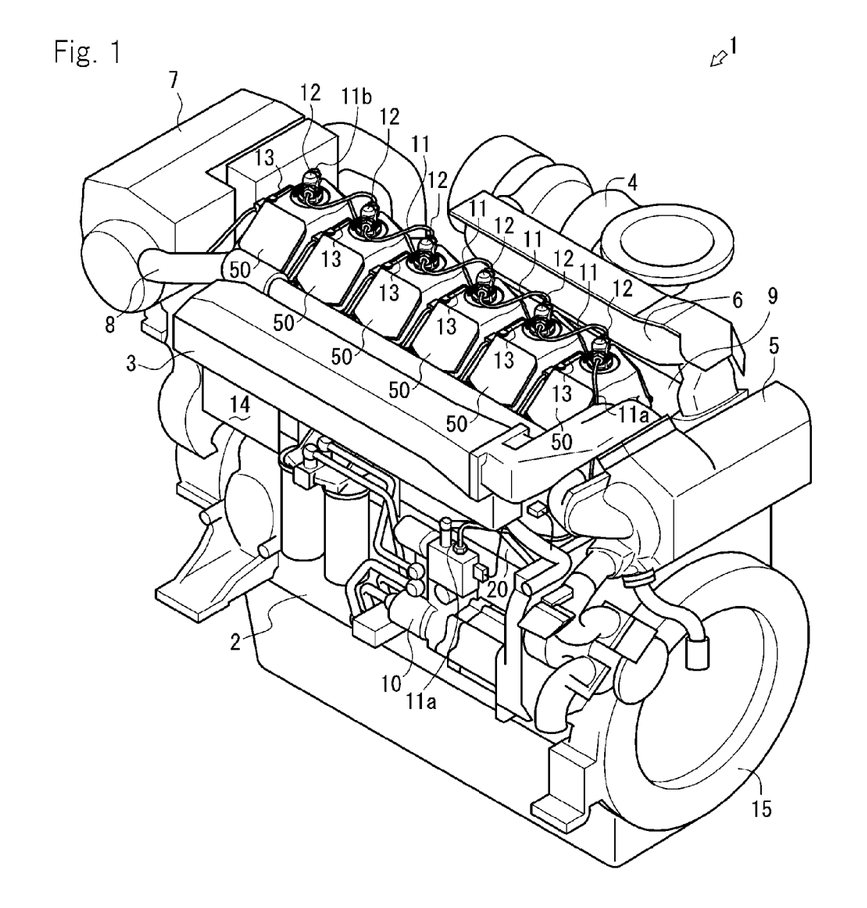
FIG. 1 is a left rear perspective view of an entire configuration of an engine according to an embodiment of the present invention.
Figure 2:
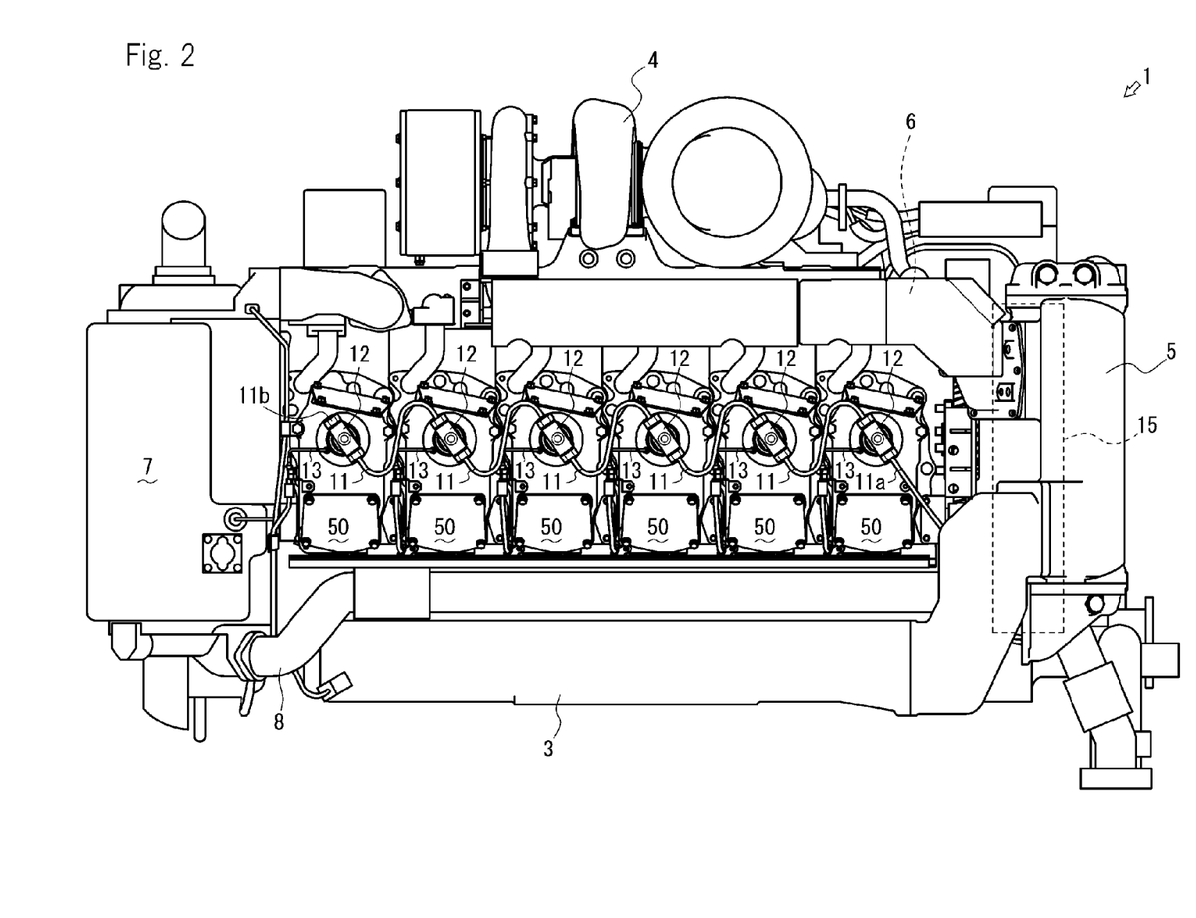
FIG. 2 is a plan view of the engine.
Figure 3:
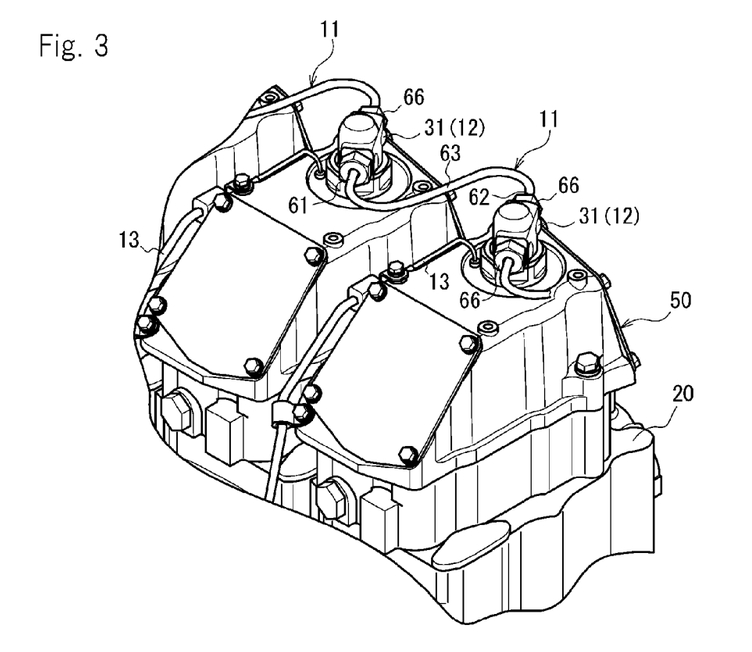
FIG. 3 is a left rear perspective view of an attachment mode of injectors and a fuel high-pressure pipe 11.

An entire configuration of an engine 1 which is an embodiment of an engine according to the present invention is explained referring to FIGS. 1 to 3. In the explanation, a side at which a flywheel 15 is arranged is regarded as a rear side of the engine 1, and a side opposite thereto is regarded as a front side. Concerning a lateral direction, the following description is based on the assumption that a left side of a front view of the engine 1 is regarded as a left side of the engine 1, and a right left side of the front view of the engine 1 is regarded as a right side of the engine 1.

The engine 1 is an in-line six-cylinder diesel engine mounted on a ship or the like. In a center section of the engine 1, a cylinder block 2 is provided. In the cylinder block 2, a crankshaft is pivoted rotatably and six cylinders are arranged at equal intervals along an axial direction of the crankshaft. A piston is provided in each of the cylinders so as to be slidable vertically. A cylinder head 20 is attached to an upper section of the cylinder block 2 so as to form a combustion chamber.

At an upper left side of the engine 1, an intake manifold 3 is provided, and at a right side of the engine 1, an exhaust manifold 9 is provided. At an upper right side of the engine 1, a supercharger 4 is provided, and at an upper right side of the engine 1, an intercooler 5, which cools air compressed by the supercharger 4, is provided. The supercharger 4 and the intercooler 5 are connected via an intake passage pipe 6. At an upper front side of the engine 1, a pure water cooler 7 is provided, and the pure water cooler 7 and the intercooler 5 are connected via a cooling pipe 8, whereby the whole engine 1 is cooled.

At a left side of the engine 1, a force feed pump 10 is provided. The force feed pump 10 is connected via a force feed fuel high-pressure pipe 11a and a fuel high-pressure pipe 11 to six injectors 12, and fuel compressed by the force feed pump 10 is supplied to the injectors 12. Each of the injectors 12 is connected via a harness 13 to a controller 14, and fuel is injected to the combustion chamber based on a signal from the controller 14. The injectors 12 are fixed while being projected upward from a bonnet 50.

Next, the injectors 12 and the fuel high-pressure pipe 11 connected between the injectors 12 are explained.

Figure 4A:
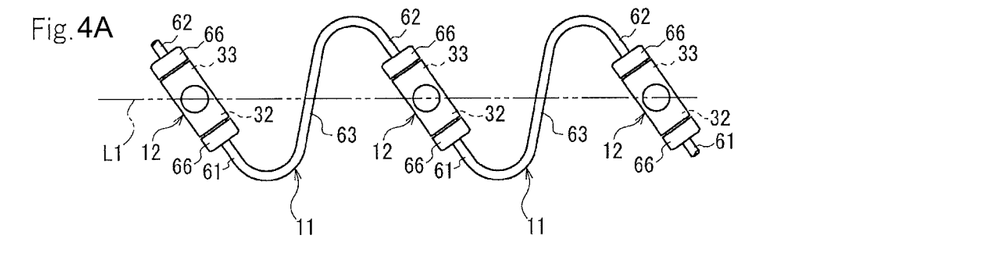
FIG. 4A is a plan view of piping of the fuel high-pressure pipe 11 in this embodiment.
Figure 5A:
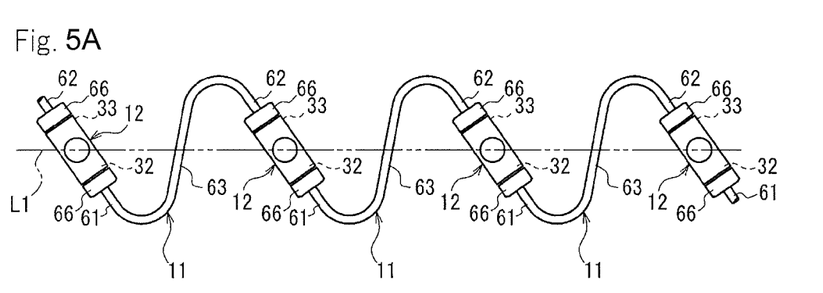
FIG. 5A is a plan view of the piping of the fuel high-pressure pipe 11 in this embodiment for connecting even numbers of the injectors to each other.

As shown in FIGS. 1, 4A and 5A, the plurality of the injectors 12 are provided on a line L1 at equal intervals when viewed in plan. A fuel injection section of each of the injectors 12 is provided in the combustion chamber, and the injector 12 penetrates an upper surface of the bonnet 50 and a projection section 31 is provided above the bonnet 50. In the projection section 31, a fuel supply port 32 for supplying fuel and a fuel discharge port 33 for discharging the fuel and supplying it to the adjacent injector 12 are provided.

Figure 6:
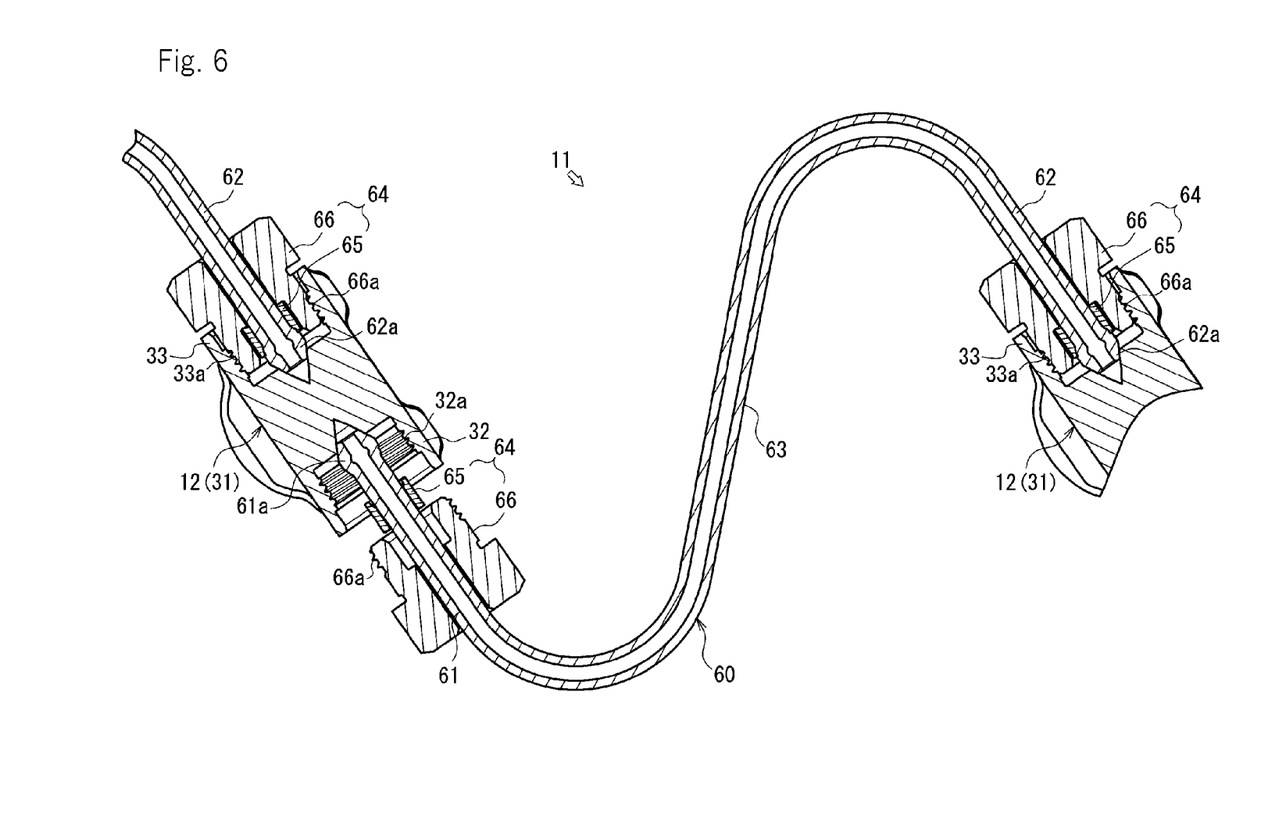
FIG. 6 is a sectional plan view of the attachment mode of the fuel high-pressure pipe 11 to the injectors.

As shown in FIGS. 1 and 6, the fuel supply port 32 is an opening through which high-pressure fuel fed from the force feed pump 10 is introduced into the injector 12. The fuel discharge port 33 is an opening through which high-pressure fuel in the injector 12 is supplied to another injector 12 adjacent to the injector 12. The fuel supply port 32 and the fuel discharge port 33 are provided respectively in opposite side surfaces of each injector 12. The fuel supply port 32 and the fuel discharge port 33 are opened coaxially. The injectors 12 are arranged at equal intervals in the longitudinal direction, and all the fuel supply ports 32 of the injectors 12 are directed to the same side, that is, the left rear side. All the fuel discharge ports 33 of the injectors 12 are directed to the same side, that is, the right front side.

The fuel high-pressure pipe 11 is connected to the fuel supply port 32 and the fuel discharge port 33. The force feed fuel high-pressure pipe 11a is connected to the fuel supply port 32 of the injector 12 at the rearmost side (most upstream side) and fuel from the force feed pump 10 is supplied to this fuel supply port 32. A blockade member 11b is provided in the fuel discharge port 33 of the injector 12 at the foremost side (most downstream side) so as to prevent leakage of fuel to the outside.

As shown in FIGS. 6 to 8A & 8B, the fuel high-pressure pipe 11 connects the adjacent two injectors 12 so as to form a fuel supply passage between the injectors 12. The fuel high-pressure pipe 11 is mainly configured by a fuel high-pressure pipe body 60 which is the fuel supply passage, and a connection member 64 which strengthens the connection between the fuel high-pressure pipe 11 and the fuel supply port 32 or the fuel discharge port 33 of the injector 12.

The fuel high-pressure pipe body 60 mainly has a first connecting section 61 and a second connecting section 62, which are both end sections thereof, and a bending section 63. The fuel high-pressure pipe body 60 is bent at two middle sections thereof so that openings of the first connecting section 61 and the second connecting section 62, which are both the end sections, that is, connection sides of the first and second connection sections 61 and 62 to be connected to the respective injectors 12, are directed opposite each other. The fuel high-pressure pipe body 60 is bent in a substantially S-like shape when viewed in plan.

The first connecting section 61 is inserted into the fuel supply port 32 of the injector 12 and connected to the injector 12. While being connected to the injector 12, the first connecting section 61 is a straight part extended from the fuel supply port 32 and is formed coaxially to the fuel supply port 32. While being connected to the injector 12, the second connecting section 62 is a straight part extended from the fuel discharge port 33 and is formed coaxially to the fuel discharge port 33. Furthermore, the first connecting section 61 and the second connecting section 62 are provided substantially in parallel to each other.

At a tip of the first connecting section 61, a head section 61a whose diameter is slightly larger than that of a middle section of the fuel high-pressure pipe 11 is formed. Similarly, at a tip of the second connecting section 62, a head section 62a whose diameter is slightly larger than that of the middle section of the fuel high-pressure pipe 11 is formed. Each of the head sections 61a and 62a is tapered and the diameter thereof is reduced toward the tip thereof.

In a center section of the fuel high-pressure pipe body 60, that is, between the first connecting section 61 and the second connecting section 62, the bending section 63 which is S-like shaped when viewed in plan is formed. The bending section 63 is formed so as to have circularly curved sections near the first connecting section 61 and the second connecting section 62, and so as to have a straight section via which the bending sections are connected to each other. The straight section is oriented at a predetermined angle (the optimal angle is) 30°) from the first connecting section 61 and the second connecting section 62 which are parallel to each other. For reducing the interval between the injectors 12, preferably, the angle of the straight section of the bending section 63 from the first connecting section 61 and the second connecting section 62 is reduced (made close to 0°). Regardless of setting of the angle (within a range from 0° to 180°), the straight section of the bending section 63 is not extended outward from the first and second connecting sections 61 and 62 in a direction (lateral direction) perpendicular to the arrangement direction of the injectors 12 (longitudinal direction), whereby the fuel high-pressure pipe 11 can be arranged compactly in the lateral direction.

The connection member 64 includes a sleeve 65 and a nut 66. The connection member 64 is attached to each of the first connecting section 61 and the second connecting section 62 of the fuel high-pressure pipe body 60 before forming the head sections 61a and 62a of the fuel high-pressure pipe body 60.

The nut 66 tightly fastens the fuel high-pressure pipe 11 to each of the fuel supply port 32 and the fuel discharge port 33 of the injector 12. An external form of the nut 66 has a diameter-reduced section whose diameter is reduced at the injector 12 side, and a male screw 66a is formed on the diameter-reduced section. An inner diameter of the nut 66 is enough to insert the fuel high-pressure pipe body 60 into the nut 66, and is expanded at the injector 12 side so that the sleeve 65 can be inserted into the nut.

The sleeve 65 is provided for transmitting fastening power of the nuts 66 to the head sections 61a and 62a so as to maintain contact surface pressure of the head sections 61a and 62a and the tapers of the fuel supply port 32 and the fuel discharge port 33 of the injector 12. The sleeve 65 is made by steel and formed so as not to drop out from the head sections 61a and 62a.

The fuel high-pressure pipe 11 is formed point-symmetrically with respect to a center (center of gravity) thereof. Accordingly, the first connecting section 61 can be connected to the fuel discharge port 33 and the second connecting section 62 can be connected to the fuel supply port 32 of another adjacent injector 12, whereby the connection can be performed without paying attention to a connection direction of the fuel high-pressure pipe 11.

Next, an embodiment about attachment of the fuel high-pressure pipe 11 to the injector 12 is explained.

Figure 7:
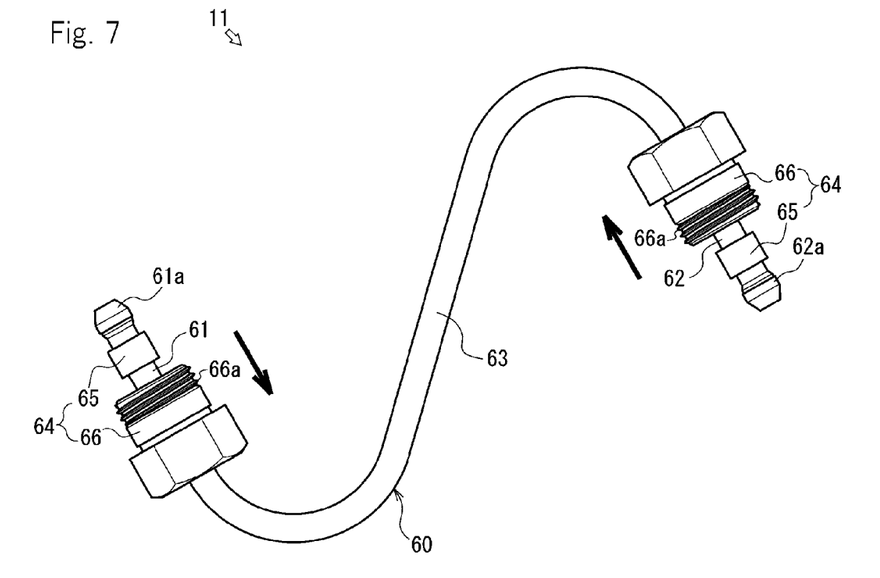
FIG. 7 is a plan view of the fuel high-pressure pipe 11 before being connected to the injectors.

Firstly, as shown in FIG. 7, the fuel high-pressure pipe 11 is previously set so that all the connection members 64 have been moved toward the bending section 63 (see thick arrows). In this state, all the head section 61a of the first connecting section 61 and the head section 62a of the second connecting section 62 are visible. Then, as shown in FIG. 6, the fuel high-pressure pipe 11 is arranged between the adjacent injectors 12. From the state in which the head sections 61a and 62a are separated from the fuel supply port 32 and the fuel discharge port 33, the fuel high-pressure pipe body 60 is rotated around the center of gravity along a horizontal plane as a rotation plane so that the head sections 61a and 62a are inserted into the fuel supply port 32 and the fuel discharge port 33, whereby the fuel high-pressure pipe 11 can be inserted into the fuel supply port 32 and the fuel discharge port 33 smoothly. Since the diameters of the fuel supply port 32 and the fuel discharge port 33 of the injector 12 are larger than those of the head sections 61a and 62a, the fuel high-pressure pipe 11 can be inserted into the fuel supply port 32 and the fuel discharge port 33 more smoothly.

Although the openings of the fuel supply port 32 and the fuel discharge port 33 are formed slightly larger than the head sections 61a and 62a in this embodiment, the opening may have only a size enough to have the head sections 61a and 62a inserted thereinto. Namely, the bending section 63 has the two curving sections so that the bending section 63 has some bendable length, whereby positions of the head sections 61a and 62a can be adjusted so that the head sections 61a and 62a can be inserted smoothly into the fuel supply port and the fuel discharge port.

Figure 8A:
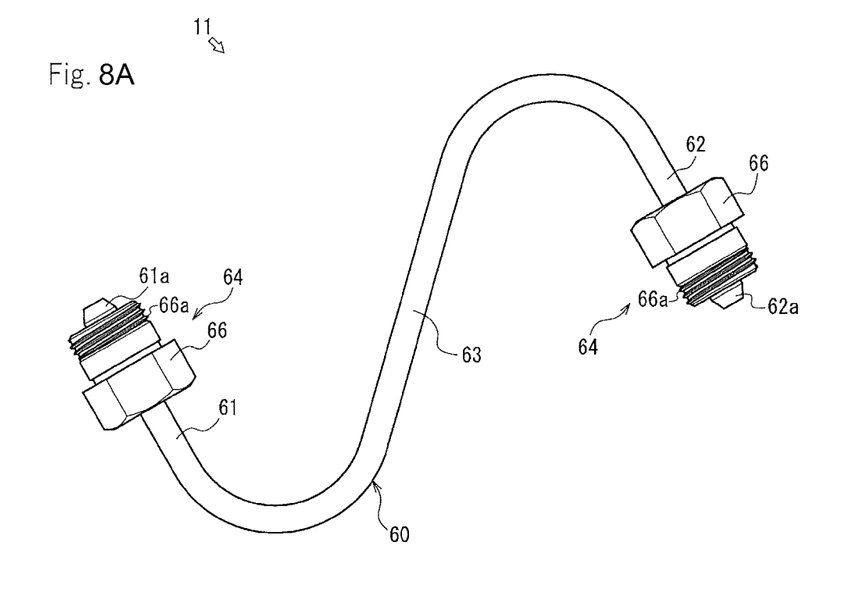
FIG. 8A is a plan view.
Figure 8B:
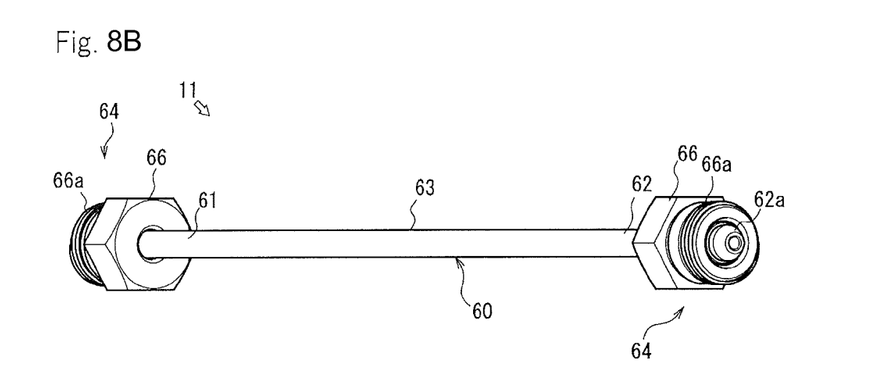
FIG. 8B is a right side view.

After finishing the insertion, for shifting the fuel high-pressure pipe 11 from the state shown in FIG. 7 to the state shown in FIG. 8A and FIG. 8B, firstly, the sleeve 65 is moved to the head section 61a so as to make the sleeve 65 contact the head sections 61a and 62a. The sleeve 65 may contact the head sections 61a and 62a before inserting the head sections 61a and 62a into the fuel supply port 32 and the fuel discharge port 33. Furthermore, the nut 66 engaged with the first connecting section 61 is moved to the side of the fuel supply port 32 of the injector 12 and the male screw 66a is screwed into a female screw 32a of the fuel supply port 32, whereby the first connecting section 61 of the fuel high-pressure pipe 11 is connected to the injector 12. Similarly, the nut 66 engaged with the second connecting section 62 is moved to the side of the fuel discharge port 33 of the injector 12 and the male screw 66a is screwed into a female screw 33a of the fuel discharge port 33, whereby the first connecting section 61 of the fuel high-pressure pipe 11 is connected to the near injector 12. Accordingly, the fuel high-pressure pipe 11 is connected between the injectors 12. The fuel high-pressure pipes 11 are extended across a line L1 passing the centers of the injectors 12 when viewed in plan. Namely, the fuel high-pressure pipes 11 are provided in spaces among the injectors 12, whereby the spaces can be used efficiently.

As described above, the fuel supply port 32 of the injector 12 at the most upstream side (rear side) is connected to the force feed pump 10 via the force feed fuel high-pressure pipe 11a. Furthermore, the blockade member 11b is screwed onto the fuel discharge port 33 of the injector 12 at the most downstream side (front side) so as to prevent leakage of high-pressure fuel to the outside. Accordingly, the high-pressure fuel from the force feed pump 10 is supplied via the force feed fuel high-pressure pipe 11a to the injector 12 at the most upstream side, supplied via the fuel high-pressure pipe 11 to the injectors 12 at the middle, and then supplied to the injector 12 at the most downstream side.

Figure 4B:
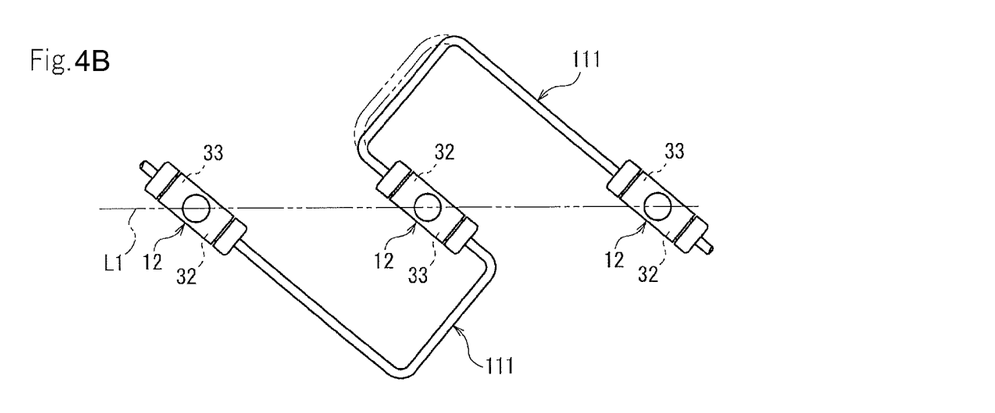
FIGS. 4B and 4C are plan views of piping of conventional fuel high-pressure pipes.
Figure 4C:
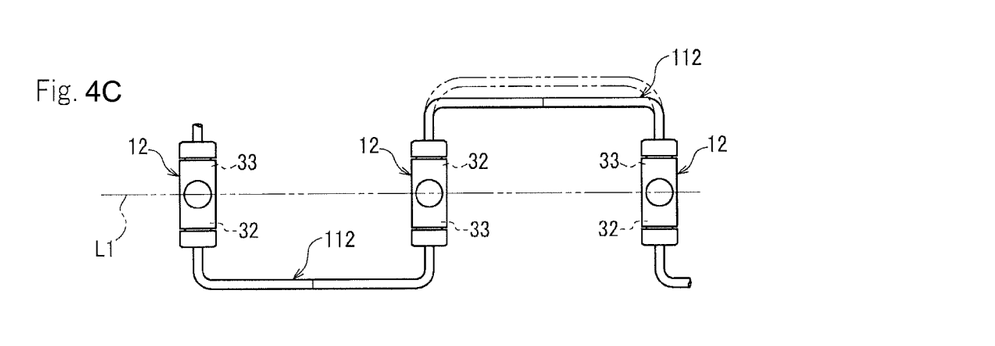
Figure 5B:
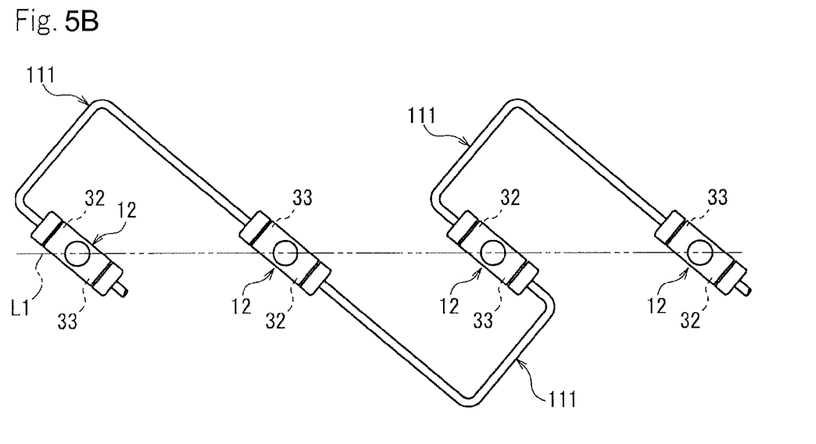
FIGS. 5B and 5C are plan views of the piping of the conventional fuel high-pressure pipes.
Figure 5C:
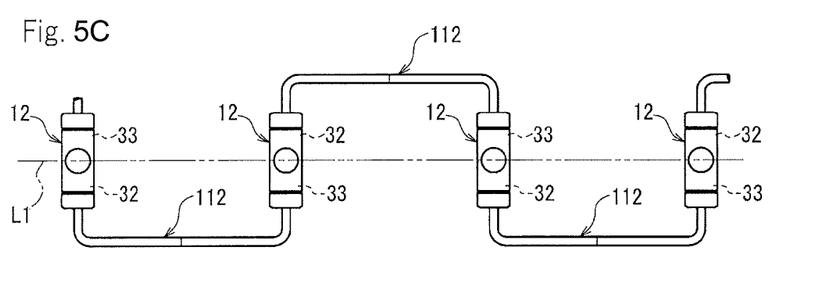

Next, the fuel high-pressure pipe 11 of the present embodiment is compared with conventional fuel high-pressure pipes 111 and 112 referring to FIGS. 4 and 5.

With respect to three arrangements shown in FIG. 4A-4C, FIG. 4A shows the connection mode of the fuel high-pressure pipes 11 of the present embodiment, FIG. 4B shows a connection mode of J-shaped fuel high-pressure pipes 111, and FIG. 4C shows a connection mode of U-shaped fuel high-pressure pipes 112.

In the cases of the fuel high-pressure pipes 11 and the J-shaped fuel high-pressure pipes 111, the injectors 12 are arranged on the line L1 when viewed in plan and a lengthwise direction of each of the injectors 12 is slanted slightly with respect to the line L1. In the case of the U-shaped fuel high-pressure pipes 112, the injectors 12 are arranged on the line L1 when viewed in plan and the lengthwise direction of each of the injectors 12 is substantially perpendicular to the line L1.

Although the lengthwise direction of each of the injectors 12 is slanted slightly with respect to the line L1, the J-shaped fuel high-pressure pipes 111 are arranged so as to extend outward in both directions alternately from the injectors 12. When a bending radius of a bending section of the fuel high-pressure pipe 111 is the same as a bending radius of the bending section of the fuel high-pressure pipe 11, the fuel high-pressure pipe 111 is expanded further outward from the injectors 12.

Although the lengthwise direction of each of the injectors 12 is substantially perpendicular to the line L1, expansion of the U-like fuel high-pressure pipes 112 outward in both directions from the injectors 12 is suppressed. However, the fuel high-pressure pipe 11 has the bending sections near the fuel supply port 32 and the fuel discharge port 33 so as to form its U-shape, and the bending sections are bent squarely at the middle portion thereof for making the connection easy, thereby having more bending sections than the fuel high-pressure pipe 11 and the U-shaped fuel high-pressure pipe 112. Furthermore, a radius of each of the bending sections of the fuel high-pressure pipe 112 near the fuel supply port 32 and the fuel discharge port 33 is smaller than that of the fuel high-pressure pipe 11. Accordingly, pressure fluctuation of high-pressure fuel flowing in the fuel high-pressure pipe 11 is lower than that flowing in the fuel high-pressure pipe 112.

Namely, the fuel high-pressure pipe 11 of the present embodiment can be suppress its full length, configured compactly, and reduce the pressure fluctuation of the high-pressure fuel flowing in the fuel high-pressure pipe 11.

Furthermore, in comparison with FIGS. 4A-4C and 5A-5C, regardless of whether the number of the injectors 12 arranged on the engine 1 is even or odd, the fuel supply port 32 of the injector 12 at the most upstream side is arranged at the same side (direction). Similarly, the fuel discharge port 33 of the injector 12 at the most downstream side is arranged at the same side (direction) as the fuel supply port 32.

However, in the case where the injectors 12 are connected to the fuel high-pressure pipes 111 or 112, at (in) which of the opposite sides (directions) the fuel supply port 32 of the injector 12 at the most upstream side is arranged depends on whether the number of the injectors 12 is even or odd. Similarly, at (in) which of the opposite sides (directions) the fuel discharge port 33 of the injector 12 at the most downstream side is arranged depends on whether the number of the injectors 12 is even or odd.

Namely, the fuel supply ports 32 of the injectors 12 to which the fuel high-pressure pipes 11 are connected are directed to the same side, whereby mistake of the directions thereof is prevented and the connection is made easy.

As the above, in the fuel high-pressure pipe 11 which connects the fuel supply port 32 and the fuel discharge port 33 of the adjacent injectors 12 to each other so as to form the fuel supply passage between the injectors 12, the first connecting section 61 and the second connecting section 62 as both the end sections of the fuel high-pressure pipe 11 are formed straight and parallel to each other, and are formed so that the head sections 61*a* and 62*a* as the connection sides of the first and second connecting sections 61 and 62 to be connected to the respective injectors 12 are directed opposite to each other.

According to the configuration, due to the first connecting section 61 and the second connecting section 62 parallel to each other, the fuel high-pressure pipe 11 can be connected easily to the injectors 12. Since the connection sides connected to the injectors 12 are formed to be directed opposite to each other, the whole fuel high-pressure pipe 11 can be formed compactly. Furthermore, since the whole fuel high-pressure pipe 11 is formed compactly, the pressure fluctuation of the high-pressure fuel flowing in the fuel high-pressure pipe 11 is suppressed, whereby fuel injection performance from the injectors 12 to the combustion chamber is improved.

The fuel high-pressure pipe 11 has the S-shaped bending section 63 between the first connecting section 61 and the second connecting section 62 which are parallel to each other.

According to the configuration, the number of bending procession positions of the fuel high-pressure pipe 11 can be reduced, and as a result, the fuel high-pressure pipe 11 can be manufactured at low cost. Even if the fuel high-pressure pipe 11 is not provided with so much bendable length, by bending only the S-shaped section of the bending section 63, the fuel high-pressure pipe 11 can be connected easily once its position agrees with the fuel supply port 32 and the fuel discharge port 33 which are the connection parts of the injectors 12. Furthermore, since the bending section 63 is formed in the S-shape, the pressure fluctuation of the high-pressure fuel flowing in the fuel high-pressure pipe 11 is suppressed.

Each of the injectors 12 has the fuel supply port 32 and the fuel discharge port 33 at the opposite sides. The plurality of the injectors 12 are provided while the fuel supply ports 32 are directed to the same side. The fuel high-pressure pipe 11 is connected to the fuel supply port 32 and the fuel discharge port 33 so as to pass the space between the adjoining injectors 12.

By connecting the fuel high-pressure pipe 11 as the above, regardless of whether the number of the injectors 12 connected by the fuel high-pressure pipe 11 is odd or even, the connection direction of the fuel high-pressure pipe 11 is the same, whereby the injectors 12 can be arranged easily. The injectors 12 are connected to each other by the fuel high-pressure pipe 11 passing the space between the injectors 12, so that the space between the injectors 12 can be used efficiently and the expansion of the fuel high-pressure pipe 11 outward from the injectors 12 can be suppressed. Accordingly, a high-temperature section such as the exhaust manifold 9 near the injectors 12 can be separated from the injectors 12, whereby safety can be improved.

Next, the fuel high-pressure pipe 111 of another embodiment is explained.

Figure 9:
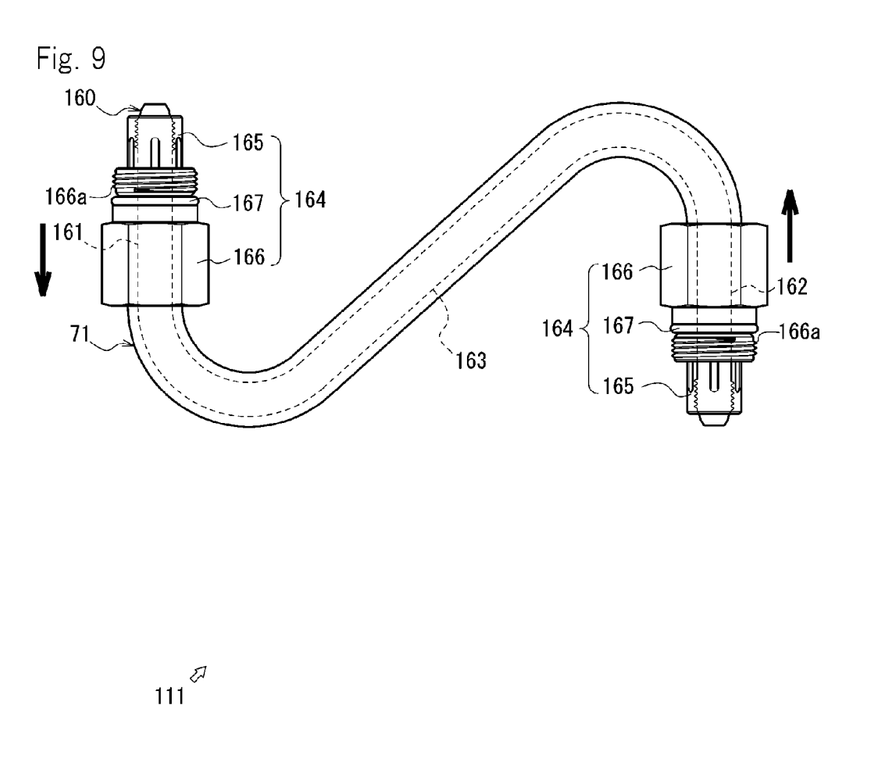
FIG. 9 is a plan view of an assembly mode of a fuel high-pressure pipe 111 according to another embodiment.
Figure 10A:
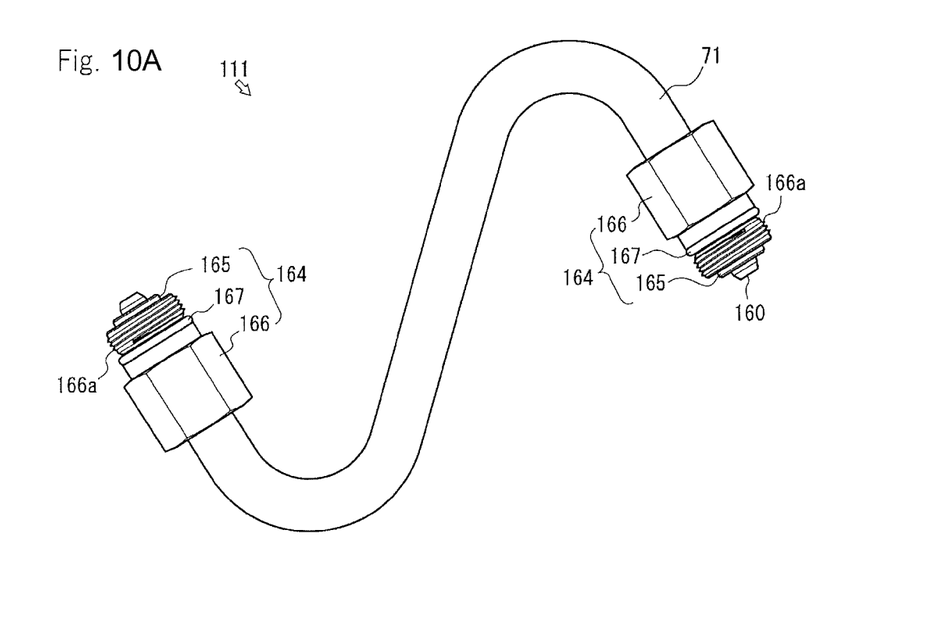
FIG. 10A is a plan view.
Figure 10B:
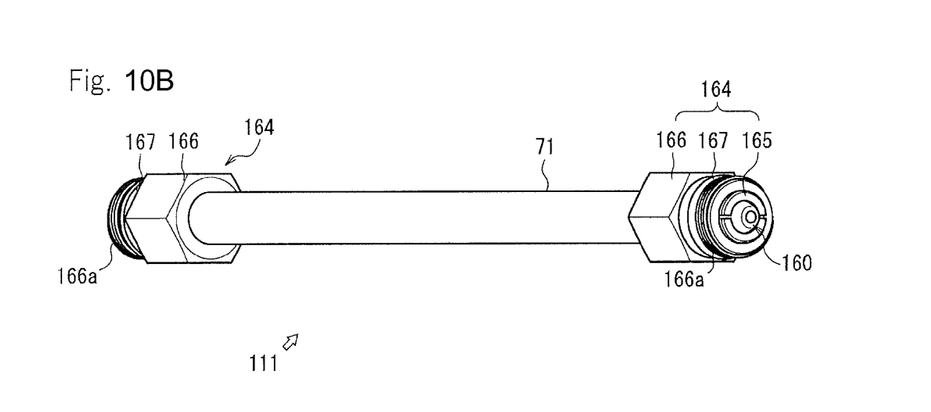
FIG. 10B is a right side view.
Figure 11:
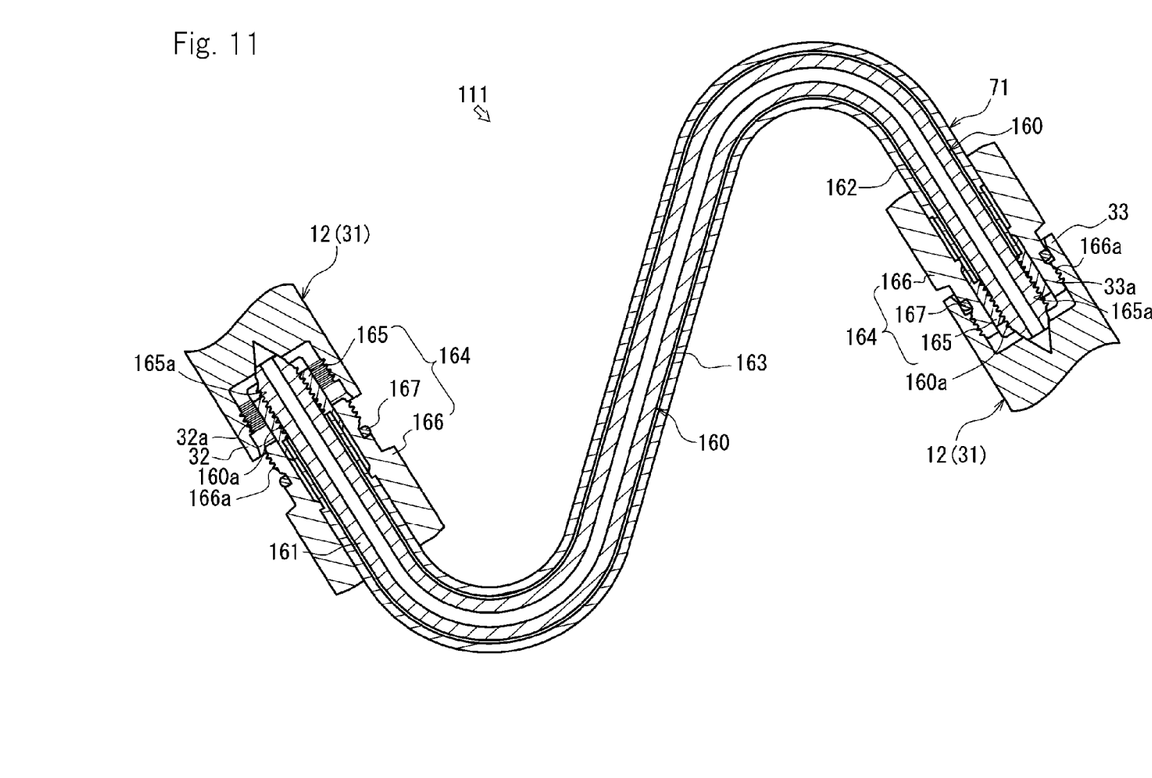
FIG. 11 is a sectional plan view of an attachment mode of the fuel high-pressure pipe 111 to the injectors.

As shown in FIGS. 9 to 11, the fuel high-pressure pipe 111 is mainly configured by a fuel high-pressure pipe body 160 which is the fuel supply passage, a protection pipe 71 covering the fuel high-pressure pipe body 160, and connection members 164 each of which strengthens the connection between the fuel high-pressure pipe 111 and the fuel supply port 32 or the fuel discharge port 33 of the injector 12.

Similarly to the fuel high-pressure pipe body 60, the fuel high-pressure pipe body 160 mainly has a first connecting section 161 and a second connecting section 162 as both end sections thereof, and a bending section 163. The fuel high-pressure pipe body 160 is bent at two middle sections thereof so that openings of the first connecting section 161 and the second connecting section 162 serving as the both end sections of the fuel high-pressure pipe body 160, that is, respective sides of the first and second connection sections 161 and 162 to be connected to the injectors 12 are directed opposite to each other. The fuel high-pressure pipe body 160 is bent in a substantially S-shape when viewed in plan.

As a center section of the fuel high-pressure pipe body 160, that is, between the first connecting section 161 and the second connecting section 162, the bending section 163 which is S-shaped when viewed in plan is formed. Circularly curved sections are formed respectively at its portions near the first connecting section 161 and the second connecting section 162, and the bending sections are connected via a straight section, whereby the bending section 163 is formed. The straight section is extended at a predetermined angle from the first connecting section 161 and the second connecting section 162 parallel to each other. Furthermore, on outer peripheral surfaces of both end sections of the fuel high-pressure pipe body 160, male screws 160*a* are formed.

The protection pipe 71 is provided outside the fuel high-pressure pipe body 160 so as to prevent scattering of fuel if the fuel high-pressure pipe body 160 is damaged. An inner diameter of the protection pipe 71 is slightly larger than an outer diameter of the fuel high-pressure pipe body 160 so as to form a space between the protection pipe 71 and the fuel high-pressure pipe body 160. Furthermore, on an inner perimeter of the protection pipe 71, a projection section (not shown) is formed to contact the outer peripheral surface of the fuel high-pressure pipe body 160 so that the protection pipe 71 can be arranged stably while maintaining a predetermined space from the fuel high-pressure pipe body 160. The protection pipe 71 is formed to be bent in a S-shape following the fuel high-pressure pipe body 160. A full length of the protection pipe 71 is shorter than that of the fuel high-pressure pipe body 160 so that both the end sections of the fuel high-pressure pipe body 160 are projected from both end sections of the protection pipe 71. Namely, in the fuel high-pressure pipe body 160, the first connecting section 161 and the second connecting section 162 which are the straight sections are formed longer than those of the fuel high-pressure pipe body 160. Furthermore, diameters of outer perimeters of both the end sections of the protection pipe 71 are smaller than that of the middle section of the protection pipe 71.

Each of the connection members 164 includes a sleeve 165, a nut 166 and an O-ring 167. The connection members 164 are provided at sides of both the tips of the fuel high-pressure pipe body 160.

The sleeve 165 is a cylindrical member provided for transmitting fastening force of the nut 166 to the first connecting section 161 (the second connecting section 162) so as to maintain contact surface pressure of the tip of the fuel high-pressure pipe body 160 and the taper of the fuel supply port 32 or the fuel discharge port 33 of the injector 12. On the inner perimeter of the sleeve 165 at the side of the injector 12, a female screw 165a is formed so as to correspond to the male screw 160a of the fuel high-pressure pipe body 160, whereby the sleeve 165 does not drop out from the tip of the fuel high-pressure pipe body 160.

The nut 166 tightly fastens the fuel high-pressure pipe body 160 to the fuel supply port 32 or the fuel discharge port 33 of the injector 12 and presses the sleeve 165 and the protection pipe 71 to each other. An external form of the nut 166 has a diameter-reduced section whose diameter is reduced at the side thereof close to the injector 12, and a male screw 166a is formed on the diameter-reduced section. An inner diameter of the nut 166 is enough to insert the sleeve 165 and the protection pipe 71 into the nut 166, and the O-ring 167 is engaged with an outer side of the diameter-reduced section of the nut 166 so as to prevent leakage of fuel.

In the case of attaching the fuel high-pressure pipe 111 to the injector 12, as shown in FIG. 9, the nut 166 engaged with the O-ring 167 is moved toward the bending section 163 (see thick arrows). In this state, by inserting the sleeve 165 with the tip of the fuel high-pressure pipe body 160 into the fuel supply port 32 (the fuel discharge port 33), the fuel high-pressure pipe 111 can be inserted smoothly into the fuel supply port 32 (the fuel discharge port 33).

When the insertion is finished, as shown in FIG. 11, the nut 166 is moved toward the fuel supply port 32 (the fuel discharge port 33) of the injector 12 and the male screw 166a is screwed into the female screw 32a (the female screw 33a) of the fuel supply port 32 (the fuel discharge port 33), whereby the fuel high-pressure pipe 111 is connected to the injector 12. Furthermore, the O-ring 167 engaged with the nut 166 prevents leakage of fuel from the connecting section of the injector 12 and the nut 166.

The invention claimed is:

1. A fuel high-pressure pipe which forms a fuel supply passage between adjacent injectors, wherein one of end sections of the high-pressure pipe is a first connecting section connected to a fuel supply port of one of the injectors, and the other end section is a second connecting section connected to a fuel discharge port of the other injector, characterized in that the first connecting section and the second connecting section are formed straight and parallel to each other, and the fuel high-pressure pipe is disposed so as to be extended across a line connecting centers of the adjacent injectors in a plan view.

2. The fuel high-pressure pipe according to claim 1, wherein a plurality of curving sections are provided between the first connecting section and the second connecting section.

3. The fuel high-pressure pipe according to claim 1, wherein the fuel supply port and the fuel discharge port of each of the injectors are arranged opposite to each other, and wherein when the fuel supply ports of the plurality of injectors are directed to the same side, the first connecting section is connected to the fuel supply port of one of the injectors and the second connecting section is connected to the fuel discharge port of the other injector so that the fuel high-pressure pipe is connected between the one of the injectors and the other injector.

4. The fuel high-pressure pipe according to claim 2, wherein the fuel supply port and the fuel discharge port of each of the injectors are arranged opposite to each other, and wherein when the fuel supply ports of the plurality of injectors are directed to the same side, the first connecting section is connected to the fuel supply port of one of the injectors and the second connecting section is connected to the fuel discharge port of the other injector so that the fuel high-pressure pipe is connected between the one of the injectors and the other injector.

* * * * *